(12) United States Patent
Speer et al.

(10) Patent No.: US 6,174,359 B1
(45) Date of Patent: Jan. 16, 2001

(54) CERAMIC DECORATION COLORING SUBSTANCES WITH INCREASED COLOR SATURATION COMPRISING ZIRCONIUM PIGMENTS, PROCESS FOR THEIR PRODUCTION AND THEIR USE

(75) Inventors: Dietrich Speer, Langenselbold; Holger Jarnicki, Eppenrod; Adalbert Huber, Langen, all of (DE)

(73) Assignee: Cerdec Aktiengesellschaft Keramische Farben, Frankfurt (DE)

( * ) Notice: Under 35 U.S.C. 154(b), the term of this patent shall be extended for 0 days.

(21) Appl. No.: 09/161,542

(22) Filed: Sep. 28, 1998

(30) Foreign Application Priority Data

Sep. 26, 1997 (DE) ................................ 197 42 522

(51) Int. Cl.$^7$ ............... C09C 1/10; C09C 1/12; C09C 1/14; C09C 1/16; C09C 1/62
(52) U.S. Cl. ............ 106/450; 106/451; 106/452; 501/18; 501/32; 65/24; 65/60.2
(58) Field of Search ................ 106/450, 451, 106/452; 65/24, 60.2; 501/18, 32

(56) References Cited

U.S. PATENT DOCUMENTS

| 3,527,649 | * | 9/1970 | Sullivan | 106/48 |
| 5,228,910 | * | 7/1993 | Joyce et al. | 106/450 |
| 5,252,126 | * | 10/1993 | Speer et al. | 106/451 |
| 5,332,412 | * | 7/1994 | Manabe et al. | 65/60.2 |
| 5,560,772 | * | 10/1996 | Huguenin et al. | 106/451 |

FOREIGN PATENT DOCUMENTS

| 0202361 | | 11/1986 | (EP) . | |
| 0368507 | | 5/1990 | (EP) . | |
| 0419843 | | 4/1991 | (EP) . | |
| 0459105 | | 12/1991 | (EP) . | |
| 0616974 | | 9/1994 | (EP) . | |
| 5010-426 | * | 7/1978 | (JP) | 3/30 |

* cited by examiner

*Primary Examiner*—Mark L. Bell
*Assistant Examiner*—Michael J. DiVerdi
(74) *Attorney, Agent, or Firm*—Wenderoth, Lind & Ponack, L.L.P.

(57) ABSTRACT

Ceramic decoration coloring substances substantially containing a zirconium pigment of the host lattice or inclusion type and a glass flux at a pigment volume concentration (PVC) of at least 30% have an increased color saturation C* if the glass flux comprises at least 71 wt. % PbO. Preferred decoration coloring substances have a PVC in the range from 40 to 70% and a PbO content of 75 to 85 wt. %. The decoration coloring substances are especially suitable for production of decorations, burned at 1000 to 1250°C, with increased color saturation C*.

18 Claims, No Drawings

CERAMIC DECORATION COLORING SUBSTANCES WITH INCREASED COLOR SATURATION COMPRISING ZIRCONIUM PIGMENTS, PROCESS FOR THEIR PRODUCTION AND THEIR USE

BACKGROUND OF THE INVENTION

The invention relates to ceramic decorating substances with increased color saturation (chroma value C* according to DIN 5033), substantially comprising a zirconium pigment of the host lattice or inclusion type and a glass flux of one or more glass frits, wherein the pigment volume concentration (PVC) is at least 30%. The invention further is directed toward a process for the production of the decoration coloring substances as well as their use, in particular for production of ceramic decorations which are burned above 1000° C., more particularly from 1100 to 1250° C.

Decoration coloring substances for the production of ceramic decorations are known. Conventionally they comprise substantially one or several pigments and a glass flux of one or several glass frits. The decoration coloring substance is formed by intimately grinding the components together (see Ullmann's Enzyklopadie der technischen Chemie, Fourth Edition (1977), Volume 14, pp. 9–10).

The market demands brilliant decorations with the strongest possible coloring power, and decorations burned in high-temperature burning processes are gaining importance. Strict requirements exist for the thermal stability of decoration coloring substances suitable for this purpose. A thermally stable pigment class comprises the so-called zirconium pigments, these being host lattice pigments such as zirconium praseodymium yellow, zirconium vanadium blue and zirconium iron pink, and zirconium inclusion pigments in which coloring crystals, such as in particular cadmium sulfide or cadmium sulfoselenides are included in zirconium silicate (=zircon) (loc. cit. pp. 2–3). The strong coloring power of a decoration coloring substance, thus its color saturation, is specified in the CIE laboratory system (DIN 5033, Part 3) as chroma value C*, wherein $C^*=(a^2+b^2)^{0.5}$ and, at the correct color shade, should have a maximum value. The C* value can be increased by increasing the pigment volume concentration (pigment in percent by volume in the fused decoration coloring substance), however, there exists interest in increasing the c* value further at a given PVC.

The object of the present invention is to provide a path by which, in a simple manner, the C* value at a PVC of at least 30% can be increased.

SUMMARY OF THE INVENTION

It has been found that by using a glass flux with et very high PbO content, surprisingly higher C* values of the decoration coloring substances burned above 1000° C. are obtained, than with a glass flux with low or average PbO content.

Accordingly, the present invention provides a ceramic decoration coloring substance with increased color saturation C*, comprising a zirconium pigment of the host lattice or inclusion type and a glass flux of one or more glass frits, wherein the pigment volume concentration (PVC) is at least 30%, which is characterized in that the glass flux comprises at least 71 wt. % of lead oxide (PbO).

DETAILED DESCRIPTION OF THE INVENTION

The preferred flux comprises 75 to 85 wt. % lead oxide. Preferred zirconium pigments are the pigments listed above in the discussion of the background of the invention.

The glass flux is one comprised of glass compositions known per se, but with the specified high PbO content. The compositions of the glass are based most frequently on lead borosilicates, but they can also be $SiO_2$-free glasses based on lead borates. Up to a PbO content of the glass flux of approximately 70 wt. %, the C* value does not increase at all with increasing PbO content, increases or only by a slight amount—minor fluctuations can result from other glass components or a special combination of the same. However, at a content of approximately 70 wt. % PbO the C* value of the decoration increases suddenly. By using such a glass flux in the form of a glass frit, it is consequently possible to obtain color-intensive decorations.

The composition preferably substantially comprises the zirconium pigment and one or several glass frits.

The pigment volume concentration is at least 30%, preferably 40 to 70%, and the pigment is preferably selected from zirconium vanadium blue, zirconium praseodymium yellow and the yellow to red zirconium inclusion pigments, such as cadmium sulfide, cadmium sulfoselenide and cadmium selenide.

The process for producing the composition of the present invention comprises grinding the zirconium pigment together with the glass flux, and optionally auxiliary substances (for example a liquid milling medium, e.g. water and/or alcohol, wetting agents, e.g. terpineol, and sedimentation agents, e.g. magnesium acetate), in a manner known per se, wherein, however, a glass flux with at least 71 wt. % PbO, preferably 75 to 85 wt. % PbO, is used.

The decoration coloring substances according to the invention can be used generally for decorating glass, porcelain and ceramics, however, they are especially well suited for the production of decorations, such as in-glaze decorations, on porcelain and other dense glazed ceramic materials, which are burned at temperatures above 1000° C., most frequently at 1100 to 1250° C.

Thus, the present invention also provides a process for production of ceramic decorations, which comprises placing the composition of the invention on a substrate to be decorated, and burning the composition in a temperature range of from 1000 to 1250 ° C., preferably 1100 to 1250° C.

Examples

In the examples and comparison examples, as the glass flux there were used glass frits whose essential components are listed in the following Table:

| Type | A | B | C | D | E | F | G |
|---|---|---|---|---|---|---|---|
| PbO | 0 | 43.8 | 64.5 | 71.2 | 75.1 | 80.4 | 82.7 |
| $SiO_2$ | 55.6 | 16.7 | 34.4 | 11.9 | 6.2 | 15.7 | 2.3 |
| $B_2O_3$ | 19.1 | 11.2 | | 16.4 | 17.3 | 3.8 | 13.4 |
| $Al_2O_3$ | 5.6 | 0.5 | 0.6 | 0.3 | | | |
| RO | 0.5 | 27.8 | | | 1.4* | | 1.6* |
| $R'_2O$ | 14.0 | — | 0.5 | 0.2 | | | |

RO = sum CaO, SrO, BaO and ZnO *
$R'_2O$ = sum $Li_2O$, $Na_2O$ and $K_2O$

As pigments there were used zirconium praseodymium yellow, zirconium vanadium blue and a red zirconium Cd(S, Se) inclusion pigment.

The production of the decoration coloring substances took place in a generally known manner by grinding the pigment together with the glass flux in a ball mill in the presence of ethanol or $H_2O$ followed by drying.

Sample preparation: 10 wt. % decoration coloring substance was made into a paste with 6 wt. % printing medium (No. 80820, Cerdec AG). A printing paper was printed by means of a Nylon screen cloth, 100 mesh, filming was carried out with a film solution (No. 80894 by Cerdec AG). The transfer picture was transferred to a porcelain plate. Burning took place for 90 minutes in a sliding-bat kiln at 1180° C.

Example 1

Decoration coloring substances were produced in known manner by grinding together a zirconium praseodymium pigment with a glass frit as the glass flux. The glass frits used were varied and, thus, also the PbO content was varied; in each instance decoration coloring substances were produced with a pigment volume concentration (PVC) of 33%, 44%, and 55%. The glass frits (type and PbO content in wt. %) used, the PVC as well as the color saturation C* according to DIN 5033, Part 3 are listed in the following Table.

| PVC (%) | Glass Frit Type/% PbO | C* |
|---|---|---|
| 33 | A/0 | 45.4 |
|  | B/44 | 43.3 |
|  | C/65 | 47.4 |
|  | D/71 | 44.8 |
|  | E/75 | 51.3 |
|  | F/80 | 53.1 |
| 44 | A/0 | 53.1 |
|  | B/44 | 55.0 |
|  | C/65 | 54.2 |
|  | D/71 | 54.3 |
|  | E/75 | 59.9 |
|  | F/80 | 62.7 |
| 55 | A/0 | 54.5 |
|  | B/44 | 57.0 |
|  | C/65 | 58.0 |
|  | D/71 | 61.7 |
|  | E/75 | 66.5 |

The Table shows that with further increasing PbO content the color saturation increases suddenly starting at a PbO content of approximately 71 wt. %.

Example 2

Analogous to Example 1, blue decoration coloring substances were produced and tested. As the pigment there was used zirconium vanadium blue. The PVC, the PbO content in wt. %, and the color saturation C* are listed in the following Table.

| PVC (%) | Glass Frit Type/% PbO | C* |
|---|---|---|
| 33 | A/0 | 18.3 |
|  | B/44 | 18.1 |
|  | C/65 | 18.3 |
|  | D/71 | 18.1 |
|  | E/75 | 20.6 |
|  | F/80 | 21.5 |
| 44 | A/0 | 21.2 |
|  | B/44 | 21.0 |
|  | C/65 | 22.3 |
|  | D/71 | 22.4 |
|  | E/75 | 24.1 |
|  | F/80 | 25.1 |
| 55 | A/0 | 22.4 |
|  | B/44 | 23.3 |
|  | C/65 | 23.5 |
|  | D/71 | 24.7 |
|  | E/75 | 27.7 |

The Table shows that with further increasing PbO content of the glass flux the color saturation C* increases suddenly in a surprising manner starting at a PbO content of approximately 71 wt. %.

Example 3 (E 3)/Comparison Example (CE 3)

The following orange-red decoration coloring substances (E 3 and CE 3) comprised a zirconium cadmium sulfoselenide inclusion pigment and a pigment volume concentration (PVC) of 50%. The color saturation and PbO contents are listed in the following Table.

|  | Glass Frit Type/Wt. % PbO | Color Saturation C* (DIN 5033) |
|---|---|---|
| E 3 | E/80.4 | 46.7 |
| CE 3 | D/44 | 41.8 |

By increasing the PbO content of the glass flux of the decoration coloring substance the color saturation C* increases.

Example 4 (E 4)/Comparison Example (CE 4)

The following red decoration coloring substances (E 4 and CE 4) each comprised the same pigment, namely a zirconium cd(S, Se) inclusion pigment at a PVC of 60%. The PbO contents of the various glass frits of the decoration coloring substances as well as the C* values are set forth in the following Table.

|  | E 4 | CE 4 |
|---|---|---|
| Glass flux: |  |  |
| Type | G | E |
| % PbO | 83 | 44 |
| C* | 50.2 | 45.8 |

The C* value is greater for E 4 due to the increased PbO content.

We claim:

1. A composition for production of ceramic decorations, which comprises a zirconium pigment of the host lattice or inclusion type and a glass flux comprising one or more glass frits, wherein the composition has a pigment volume concentration, on the basis of a fused composition, of at least 30%, and the glass flux comprises at least 75.1 weight % of PbO based on the weight of the glass flux.

2. The composition as claimed in claim 1, wherein the PbO content of the glass flux is 75.1 to 85 weight %.

3. The composition as claimed in claim 1, wherein the pigment volume concentration is 40 to 70% and the pigment is selected from the group consisting of zirconium vanadium blue, zirconium praseodymium yellow and the yellow to red zirconium inclusion pigments.

4. The composition as claimed in claim 3, wherein the inclusion pigments are selected from the group consisting of cadmium sulfide, cadmium sulfoselenide and cadmium selenide.

5. The composition as claimed in claim 2, wherein the pigment volume concentration is 40 to 70% and the pigment is selected from the group consisting of zirconium vanadium blue, zirconium praseodymium yellow and the yellow to red zirconium inclusion pigments.

6. The composition as claimed in claim 5, wherein the inclusion pigments are selected from the group consisting of cadmium sulfide, cadmium sulfoselenide and cadmium selenide.

7. A process for production of the composition as claimed in claim 1, which comprises grinding the zirconium pigment together with the glass flux.

8. The process as claimed in claim 7, wherein auxiliary substances are ground with the pigment and glass flux.

9. The process as claimed in claim 7, wherein the PbO content of the glass flux is 75.1 to 85 weight %.

10. The process as claimed in claim 7, wherein the pigment volume concentration is 40 to 70% and the pigment is selected from the group consisting of zirconium vanadium blue, zirconium praseodymium yellow and the yellow to red zirconium inclusion pigments.

11. The process as claimed in claim 10, wherein the inclusion pigments are selected from the group consisting of cadmium sulfide, cadmium sulfoselenide and cadmium selenide.

12. The process as claimed in claim 8, wherein the PbO content of the glass flux is 75.1 to 85 weight %.

13. The process as claimed in claim 8, wherein the pigment volume concentration is 40 to 70% and the pigment is selected from the group consisting of zirconium vanadium blue, zirconium praseodymium yellow and the yellow to red zirconium inclusion pigments.

14. The process as claimed in claim 8, wherein the inclusion pigments are selected from the group consisting of cadmium sulfide, cadmium sulfoselenide and cadmium selenide.

15. A process for production of ceramic decorations, which comprises placing the composition as claimed in claim 1 on a substrate to be decorated, and burning the composition in a temperature range of from 1000 to 1250° C.

16. The process as claimed in claim 15, wherein the PbO content of the glass flux is 75.1 to 85 weight %.

17. The process as claimed in claim 15, wherein the pigment volume concentration is 40 to 70% and the pigment is selected from the group consisting of zirconium vanadium blue, zirconium praseodymium yellow and the yellow to red zirconium inclusion pigments.

18. The process as claimed in claim 17, wherein the inclusion pigments are selected from the group consisting of cadmium sulfide, cadmium sulfoselenide and cadmium selenide.

\* \* \* \* \*